Patented Dec. 11, 1928.

1,694,884

UNITED STATES PATENT OFFICE.

GEORGES LE FLOCH, OF PARIS, FRANCE.

MANUFACTURE OF DYESTUFFS FROM NAPHTHIDINE.

No Drawing. Application filed December 13, 1923, Serial No. 680,349, and in France December 21, 1922.

This invention relates to a new group of dyestuffs produced by transforming into a quinone a cyclic product of naphthidine, or a salt thereof, or a suitable derivative thereof.

The new dyestuffs are made by the action of a ring forming agent, such as aluminium chloride on naphthidine, on a salt thereof, or on a suitable derivative thereof, and transforming the product so formed into a quinone by oxidation or otherwise, such product being, before the transformation into a quinone, if necessary, isolated by dissolving in a suitable solvent; or it is vatted, filtered and again oxidized.

When naphthidine (diaminodinaphthyl) or a salt thereof, or a suitable derivative thereof, is heated with anhydrous aluminium chloride (with or without the addition of an alkali salt) bodies are produced from which vat dyestuffs can be made; some of these dyestuffs are of great commercial value.

The manufacture of the dyestuffs is illustrated in the example given, but it is to be understood that the proportion given, the conditions of the reaction, such as the temperature, and the duration of the reaction, may vary within fairly wide limits. Moreover, aluminium chloride may be replaced by other ring forming agents, such as, for example, ferric chloride.

Example.

One part by weight of naphthidine base and three parts of anhydrous aluminium chloride are finely powdered and well mixed. They are heated in an oil bath to 135° C. A very brisk reaction takes place. The temperature rises and the mass liquefies. The liquid is agitated and the reaction arrested. The cooled product is pulverized and washed with 3% hydrochloric acid. It may be dried and purified by extracting with any usual solvent.

This reaction may be represented by the following equation—

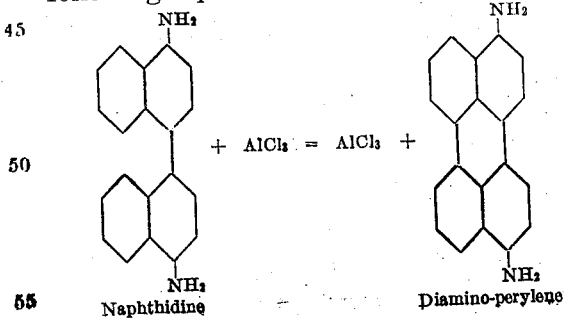

Naphthidine        Diamino-perylene

After pulverization, the product may directly be oxidized, for example, by means of one part of sodium bichromate, twelve parts of water, and sulphuric acid in a quantity sufficient to liberate chromic acid; whereby a yield of 3-10 perylene quinone is obtained.

This reaction may be represented by the following equation—

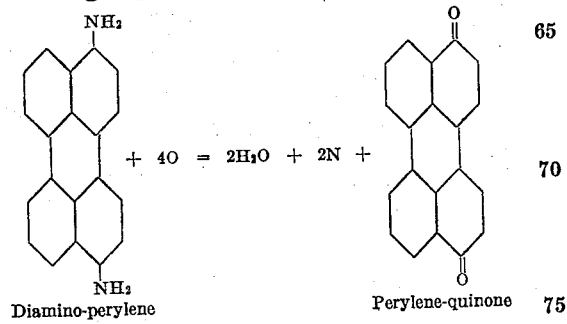

Diamino-perylene        Perylene-quinone

The residue when washed with water, forms in part a red vat from which the product is precipitated by oxidation.

By extraction with a solvent (pyridine for example) a body is obtained which produces a vivid red vat. It dyes cotton yellow. When the product is suspended in nitrobenzene (a trace of iodine being added as a catalyst) and treated hot with chlorine, a chlorinated derivative is obtained which gives a red vat dyeing a vivid yellow. Treatment with bromine produces a brominated derivative dyeing orange. These dyestuffs appear to be derivatives of perylene quinone.

Nitrated amino, anilide and other derivatives can be obtained.

In place of oxidizing with chromic acid, the product first produced may be dissolved in concentrated sulphuric acid, and acted on with nitrous acid, as when replacing $NH_2$ groups with OH groups.

What I claim is:

The method of manufacturing 3-10 perylene quinone which includes causing a reaction of a ring-forming agent upon a substance containing the naphthidine radical, and energetically oxidizing the product thereby obtained.

In testimony whereof I affix my signature.

GEORGES LE FLOCH.